United States Patent
Mealing et al.

(10) Patent No.: US 9,778,546 B2
(45) Date of Patent: Oct. 3, 2017

(54) PROJECTOR FOR PROJECTING VISIBLE AND NON-VISIBLE IMAGES

(71) Applicant: MEP TECH, INC., Salt Lake City, UT (US)

(72) Inventors: Donald Roy Mealing, Park City, UT (US); Mark L. Davis, Salt Lake City, UT (US); Roger H. Hoole, Salt Lake City, UT (US); Matthew L. Stoker, Bountiful, UT (US); W. Lorenzo Swank, Bountiful, UT (US); Michael J. Bradshaw, Bountiful, UT (US)

(73) Assignee: MEP TECH, INC., Salt Lake City, UT (US)

( * ) Notice: Subject to any disclaimer, the term of this patent is extended or adjusted under 35 U.S.C. 154(b) by 250 days.

(21) Appl. No.: 13/968,267

(22) Filed: Aug. 15, 2013

(65) Prior Publication Data

US 2015/0049308 A1  Feb. 19, 2015

(51) Int. Cl.
*G03B 17/54* (2006.01)
*G03B 33/12* (2006.01)
(Continued)

(52) U.S. Cl.
CPC ............ *G03B 17/54* (2013.01); *G03B 33/12* (2013.01); *G06F 3/0425* (2013.01);
(Continued)

(58) Field of Classification Search
CPC .................................. G03B 21/14; G21F 1/16
See application file for complete search history.

(56) References Cited

U.S. PATENT DOCUMENTS 5,844,985 A  12/1998 Kulberg et al.
5,853,327 A  12/1998 Gilboa
(Continued)

FOREIGN PATENT DOCUMENTS

EP   1827630 B1   5/2008
WO   2007/107874 A2   9/2007
WO   2009/149112 A1   12/2009

OTHER PUBLICATIONS

Mike Hanlon, "Philips Entertaible—Electronic Multi-Touch Tabletop Gaming Platform," gizmag, Sep. 3, 2006, accessible online at http://www.gizmag.com/go/6093/.
(Continued)

*Primary Examiner* — Sultan Chowdhury
*Assistant Examiner* — Danelle L Owens
(74) *Attorney, Agent, or Firm* — Durham Jones & Pinegar, P.C.

(57) ABSTRACT

A projector that projects a visible image as well as a non-visible image. The non-visible image might be used for any purpose, but an example is in order to provide depth information regarding physical item(s) interacting with the projected visible image. The projector includes multiple projecting units (e.g., one for each pixel to be displayed), each including light-emitting elements configured to emit light in the visible spectrum. Some or all of those projecting units might also include an emitting element for emitting light in the non-visible spectrum so as to collectively emit a non-visible image. Optics may be positioned to project the visible image and the non-visible image. A depth sensing module detects depth of surfaces within the scope of the non-visible image using a reflected portion of the non-visible image.

12 Claims, 6 Drawing Sheets

(51) Int. Cl.
  *G06F 3/042* (2006.01)
  *H04N 9/31* (2006.01)
  *H04N 13/02* (2006.01)

(52) U.S. Cl.
  CPC ......... *H04N 9/3164* (2013.01); *H04N 9/3179* (2013.01); *H04N 9/3194* (2013.01); *H04N 13/0271* (2013.01)

(56) References Cited

U.S. PATENT DOCUMENTS

| | | |
|---|---|---|
| 6,281,878 B1 | 8/2001 | Montellese |
| 6,331,145 B1 | 12/2001 | Sity et al. |
| 6,611,252 B1 | 8/2003 | DuFaux |
| 6,614,422 B1 | 9/2003 | Rafii et al. |
| 6,650,318 B1 | 11/2003 | Arnon |
| 6,710,770 B2 | 3/2004 | Tomasi et al. |
| 6,728,582 B1 | 4/2004 | Wallack |
| 6,750,849 B2 | 6/2004 | Potkonen |
| 6,798,401 B2 | 9/2004 | DuFaux |
| 6,832,954 B2 | 12/2004 | Odake et al. |
| 6,955,297 B2 | 10/2005 | Grant |
| 7,095,033 B2 | 8/2006 | Sorge |
| 7,204,428 B2 | 4/2007 | Wilson |
| 7,397,464 B1 | 7/2008 | Robbins et al. |
| 7,450,086 B2 | 11/2008 | Thielman et al. |
| 7,634,128 B2 | 12/2009 | Snow et al. |
| 7,753,798 B2 | 7/2010 | Soltys et al. |
| 7,934,836 B2 | 5/2011 | Ito |
| 7,961,934 B2 | 6/2011 | Thrun et al. |
| 8,134,717 B2 | 3/2012 | Pangrazio et al. |
| 8,425,325 B2 | 4/2013 | Hope |
| 8,442,304 B2 | 5/2013 | Marrion et al. |
| 8,485,907 B2 | 7/2013 | Soltys et al. |
| 8,672,755 B2 | 3/2014 | Guthrie et al. |
| 8,784,206 B1 | 7/2014 | Gronkowski et al. |
| 8,905,551 B1* | 12/2014 | Worley, III ............. G06F 3/011 353/122 |
| 8,933,974 B1* | 1/2015 | Marason ................ G09G 3/002 345/690 |
| 2003/0047683 A1 | 3/2003 | Kaushal |
| 2004/0102247 A1 | 5/2004 | Smoot et al. |
| 2004/0160000 A1 | 8/2004 | Lindsey et al. |
| 2005/0088623 A1 | 4/2005 | Przybyla et al. |
| 2005/0162381 A1 | 7/2005 | Bell et al. |
| 2005/0192094 A1 | 9/2005 | Okada et al. |
| 2005/0219552 A1 | 10/2005 | Ackerman et al. |
| 2005/0245302 A1 | 11/2005 | Bathiche et al. |
| 2006/0050243 A1 | 3/2006 | Huewel |
| 2006/0052163 A1 | 3/2006 | Aida |
| 2006/0052885 A1 | 3/2006 | Kong |
| 2006/0073869 A1 | 4/2006 | LeMay et al. |
| 2006/0073891 A1 | 4/2006 | Holt |
| 2006/0073892 A1 | 4/2006 | Watanabe et al. |
| 2006/0274972 A1 | 12/2006 | Peterson |
| 2007/0046625 A1 | 3/2007 | Yee |
| 2007/0178955 A1 | 8/2007 | Mills |
| 2007/0201863 A1 | 8/2007 | Wilson et al. |
| 2008/0032808 A1 | 2/2008 | Ochi |
| 2008/0122805 A1 | 5/2008 | Smith et al. |
| 2008/0217851 A1 | 9/2008 | Colton |
| 2008/0278894 A1 | 11/2008 | Chen et al. |
| 2008/0280682 A1 | 11/2008 | Brunner et al. |
| 2008/0318550 A1 | 12/2008 | DeAtley |
| 2009/0020947 A1 | 1/2009 | Albers |
| 2009/0029754 A1 | 1/2009 | Slocum et al. |
| 2009/0104976 A1 | 4/2009 | Ouwerkerk et al. |
| 2009/0124382 A1 | 5/2009 | Lachance et al. |
| 2009/0168027 A1 | 7/2009 | Dunn et al. |
| 2009/0185139 A1 | 7/2009 | Morikuni |
| 2009/0264196 A1 | 10/2009 | Fujimoto |
| 2009/0323029 A1 | 12/2009 | Chen et al. |
| 2010/0007582 A1 | 1/2010 | Zalewski |
| 2010/0020026 A1 | 1/2010 | Benko et al. |
| 2010/0035684 A1 | 2/2010 | Kotlarik et al. |
| 2010/0113148 A1 | 5/2010 | Haltovsky et al. |
| 2010/0182402 A1 | 7/2010 | Nakajima et al. |
| 2010/0203965 A1 | 8/2010 | Juds et al. |
| 2010/0241976 A1 | 9/2010 | Nozaki et al. |
| 2010/0279768 A1 | 11/2010 | Huang et al. |
| 2010/0285881 A1 | 11/2010 | Bilow |
| 2011/0007140 A1 | 1/2011 | Nakahata et al. |
| 2011/0111833 A1 | 5/2011 | Nordahl et al. |
| 2011/0133934 A1 | 6/2011 | Tan et al. |
| 2011/0165923 A1 | 7/2011 | Davis et al. |
| 2011/0181553 A1* | 7/2011 | Brown et al. ............. 345/175 |
| 2011/0256927 A1 | 10/2011 | Davis et al. |
| 2011/0288964 A1 | 11/2011 | Linder et al. |
| 2012/0026376 A1 | 2/2012 | Goran |
| 2012/0162544 A1 | 6/2012 | Nicholson et al. |
| 2012/0223885 A1 | 9/2012 | Perez |
| 2012/0280941 A1* | 11/2012 | Hu ............................ 345/175 |
| 2013/0113975 A1 | 5/2013 | Gabris |
| 2014/0043516 A1* | 2/2014 | Baker ..................... 348/333.1 |

OTHER PUBLICATIONS

European Patent Office as International Searching Authority, "International Search Report and Written Opinion," mailed Jun. 7, 2011, in related PCT application No. PCT/US2011/020058.

Andrew D. Wilson, "PlayAnywhere: a compact interactive tabletop projection-vision system," USIT '05 Proceedings of the 18th annual ACM symposium on User interface software and technology, pp. 83-92; (2005, ACM New York, New York).

United States Patent and Trademark Office, Acting as the International Search Authority, "International Search Report and Written Opinion," mailed Apr. 2, 2015 in international patent application No. PCT/US2014/051365.

Ramesh Raskar, et al., "The Office of the Future: A Unified Approach to Image-Based Modeling and Spatially immersive Displays," ACM, Proceedings of the 25th Annual Conference on Computer G (Jul. 24, 1998).

Andrew D. Wilson, et al., "Combining Multiple Depth Cameras and Projectors for Interactions on, above, and between surfaces," ACM, Proceedings of the 23rd Annual ACM Symposium on User Interface Software and Technology, pp. 273-282 (Oct. 6, 2010).

Ramesh Raskar, et al., "iLamps: Geometrically Aware and Self-Configuring Projectors", ACM SIGGRAPH 2006 Courses, Article No. 7 (2006).

Alexander Kulik,et al., "C1 ×6: A Stereoscopic Six-User Display for Co-located Collaboration in Shared Virtual Environments," ACM, ACM Transactions on Graphics (Dec. 2011).

Chris Harrison, et al., "OmniTouch: Wearable Multitouch Interaction Everywhere," ACM, UIST '11 Proceedings of the 24th Annual ACM Symposium on User Interface Software and Technology, pp. 441-450 (Oct. 19, 2011).

Pillip Staud, et al., "Pal map: Designing the Future of Maps," ACM, OZCHI '09 Proceedings of the 21st Annual Conference of the Australian Computer-Human Interaction Special Interest Group: Design: Open 24/7, pp. 427-428 (Nov. 27, 2009).

Claudio Pinhanez, "The Everywhere Displays Projector: A Device to Create Ubiquitous Graphical Interfaces," Springer-Verlag, Ubicomp 2001: Ubiquitous Computing, pp. 315-331 (2001).

Oliver Bimber, et al., "Enabling View-Dependent Stereoscopic Projection in Real Environments," IEEE, Proceedings of the International Symposium on Mixed and Augmented Reality (ISMAR 2005).

Bernd Frohlich, et al., "Implementing Multi-Viewer Stereo Displays," WSCG 2005: Full Papers: The 13th International conference in Central Europe on Computer Graphics, Visualization and Computer Vision (Feb. 4, 2005).

Stephen J. Krotosky, et al., "A Comparison of Color and Infrared Stereo Approaches to Pedestrian Detection," Proceedings of the 2007 IEEE Intelligent Vehicles Symposium, pp. 81-86 (Jun. 13-15, 2007).

* cited by examiner

000# PROJECTOR FOR PROJECTING VISIBLE AND NON-VISIBLE IMAGES

BACKGROUND

Projectors are conventionally designed to project a visible image in which the projected light has frequencies within the visible spectrum. For instance, conventional projectors are capable of projecting an image composed of multiple pixels, each emitted by a distinct pixel unit. For each pixel unit, the projector includes multiple light-emitting diodes (LEDs). For instance, a pixel unit typically might include a red LED, a green LED, and a blue LED. The projected image passes through optics in a manner that the visible image is then focused on a surface at a distance from the projector. Projectors are not conventionally used to project images outside of the visible spectrum.

BRIEF SUMMARY

Embodiments described herein relate to a projector that projects a visible image as well as a non-visible image. The non-visible image might be used for any purpose, but an example is to provide depth information regarding physical item(s) interacting with the projected visible image.

The projector includes multiple projecting units (e.g., one for each pixel to be displayed). Each projecting unit includes light-emitting elements configured to emit light in the visible spectrum. Some or all of those projecting units might also include an emitting element for emitting light in the non-visible spectrum so as to collectively emit a non-visible image. Optics may be positioned to project the visible image and the non-visible image. The optics might include a portion that directs a reflected portion of the non-visible image (and perhaps also a reflected portion of the visible image) to a camera for capture of the reflected image. A depth sensing module detects depth of surfaces within the scope of the non-visible image using the reflected portion of that non-visible image.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

The principles described herein relate to a projection system, or a projector, that projects a visible image as well as a non-visible image. The non-visible image might be used for any purpose, but an example is to provide depth information regarding physical item(s) interacting with the projected visible image.

The projection system includes multiple projecting units (e.g., one for each pixel to be displayed). Each projecting unit includes light-emitting elements configured to emit light in the visible spectrum. Some or all of those projecting units might also include an emitting element for emitting light in the non-visible spectrum so as to collectively emit a non-visible image. Optics may be positioned to project the visible image and the non-visible image. The optics might include a portion that directs a reflected portion of the non-visible image (and perhaps also a reflected portion of the visible image) to a camera for capture of the reflected image. A depth sensing module detects depth of surfaces within the scope of the non-visible image using the reflected portion of that non-visible image.

Figure 1:
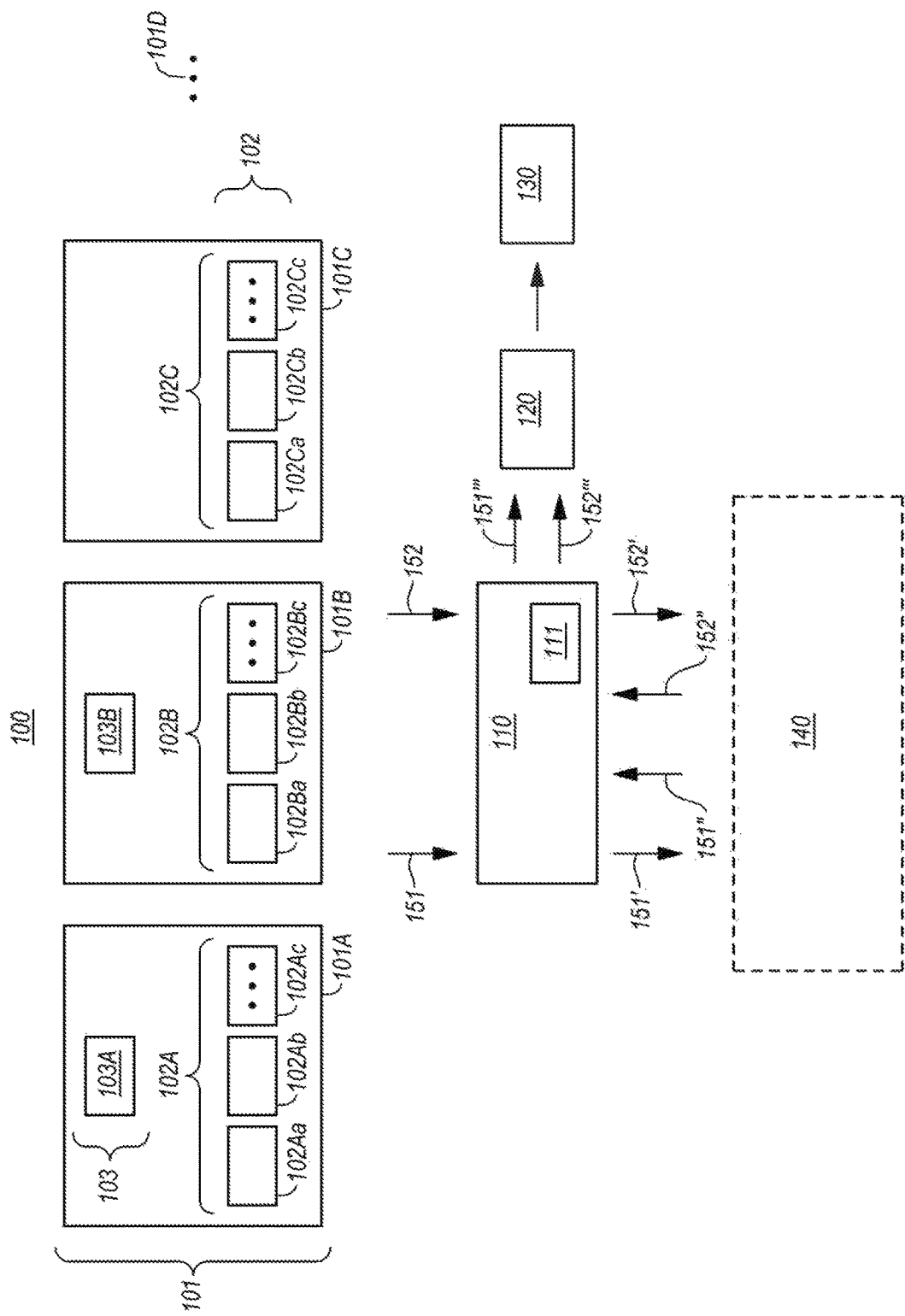
FIG. 1 abstractly illustrates a projection system that includes a projector that includes projecting units, each for projecting a pixel of a visible image.

FIG. 1 abstractly illustrates a projection system 100 that includes a projector that includes projecting units 101, each for projecting a pixel of a visible image. For instance the projecting units 101 are illustrated as including three projecting units 101A, 101B and 101C, although the ellipses 101D abstractly represent that the projection system 100 would typically including many more projecting units 101, as modern projectors typically can project images of hundreds and thousands, or even millions of pixels, and future projectors may be capable of generating even more. However, to simplify the description, only three projecting units 101A, 101B and 101C (corresponding to just three pixels) are illustrated.

Each projecting unit has multiple light-emitting elements that are configured to emit in the visible spectrum of electromagnetic wavelengths that are visible to the human eye. For instance, projecting unit 101A is illustrated as including light-emitting elements 102A in the form of two light-emitting elements 102Aa and 102Ab, although the ellipses 102Ac represent that there may be other numbers of light-emitting elements 102A within the projecting unit 101A that are also capable of emitting light in the visible spectrum.

The same is true of the other projecting units in the projecting units 101. For instance, projecting unit 101B is illustrated as including light-emitting elements 102B in the form of two light-emitting elements 102Ba and 102Bb, although the ellipses 102Bc represent that there may be other numbers of light-emitting elements 102B within the projecting unit 101B that are also capable of emitting light in the visible spectrum. Furthermore, projecting unit 101C is illustrated as including light-emitting elements 102C in the form of two light-emitting elements 102Ca and 102Cb, although the ellipses 102Cc represent that there may be other numbers of light-emitting elements 102C within the projecting unit 101C that are also capable of emitting light in the visible spectrum. The same may be true of the other projecting units 101 that are not illustrated and which are represented by the ellipses 101D.

In one embodiment, the light-emitting elements 102 within each of the projecting units 101 constitutes a red light-emitting element, a green light-emitting element, and a blue light-emitting element. For instance, light-emitting element 102Aa of the projecting unit 101A might be a red Light-Emitting Diode (LED), the light-emitting element 102Ab of the projecting unit 101A might be a green LED, and another light-emitting element (represented by ellipses 102Ac) of the projecting unit 101A might be a blue LED.

Some or all of the projecting units 101 comprise further emitting elements 103 that emit light outside of the visible spectrum. The group of projecting units 101 that are capable of doing this are sometimes referred to herein as a "collection" of the projecting units 101. The collection could be all of the projecting units 101, or just a subset of the projecting units 101. The use of the term "collection" should not be construed as implying that such projecting units are collected together, as the collection may be distributed in any manner amongst the total number of projecting units.

In FIG. 1, the projecting unit 101A is illustrated as including an emitting element 103A that emits light outside of the visible spectrum. Likewise, projecting unit 101B is illustrated as including emitting element 103B that emits light outside of the visible spectrum. Projecting unit 101C is not shown as including a corresponding emitting element 103 that emits outside of the visible spectrum, emphasizing that the broadest principles described herein do not require that all of the projecting units 101 have an emitting element 103 that emits light outside of the visible spectrum. In one embodiment, each of the emitting elements 103 might emit infra-red light.

Figure 2:
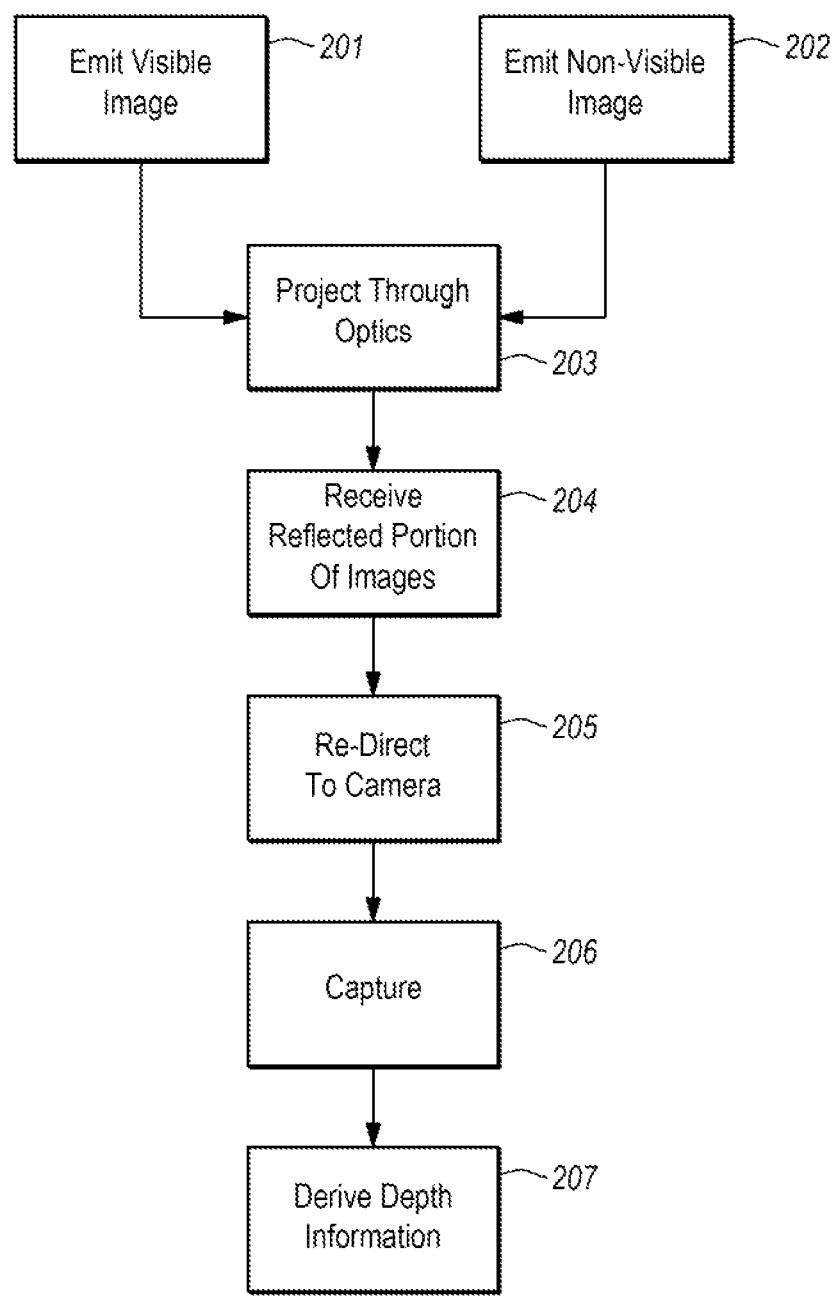
FIG. 2 illustrates a flowchart of a method for projecting an image.

The light-emitting elements 102 thus collectively emit a visible image 151 represented abstractly as an arrow. Likewise, the collection of emitting elements 103 thus emits a non-visible image 152, as represented by another arrow. FIG. 2 illustrates a flowchart of a method 200 for projecting an image. As the method 200 may be performed in the context of the projection system 100, FIGS. 1 and 2 will be described in an integrated fashion with frequent reference to each other.

The method 200 includes emitting a portion of a visible image from each projecting unit to thereby generate a visible image (act 201). In the context of FIG. 1, this has already been described with respect to the light-emitting elements 102 of the respective projecting units 101 emitting a visible image 151. The method 200 also includes emitting a portion of a non-visible image from each of at least some of the projecting units (act 202). In the context of FIG. 1, this has already been described with respect to the emitting elements 103 of the collection of projecting units 101 emitting non-visible image 152.

The projection system 100 further includes optics 110 positioned to project the visible image 151 emitted by the projecting units 101, and also to project the non-visible image 152 emitted by the collection of projecting units 101 (i.e., the set of the projecting units 101 that includes an emitting element 103). The method 200 thus further includes projecting the visible image and the non-visible image through optics (act 203). The projected form of the visible image 151 is represented by projected visible image 151'. The projected form of the non-visible image 152 is represented by projected non-visible image 152'. The visible image 151 and the non-visible image 152 are projected into a field of projection 140. For instance, the field of projection 140 might be a wall, table-top, a flat surface, a complex surface, and might include one or more mobile objects (such as a hand or game pieces) positioned within the field of projection 140.

A reflected portion 151" of the projected visible image 151' is received back into the optics 110. Likewise, a reflected portion 152" of the projected non-visible image 152' is received back into the optics 110. Accordingly, the method 200 further includes the optics 110 receiving a reflected portion of the visible image 151 and the non-visible image 152 (act 204). In one embodiment, the surface onto which the projected visible image 151' and the projected non-visible image 152' are projected may be the same surface on which the projection system 100 sits.

A portion 151''' of the reflected portion 151" of the projected visible image 151' is redirected to a camera 120 by a portion 111 of the optics 110, whereupon the camera 120 captures the portion 151''' of the projected visible image 151'. Likewise, a portion 152''' of the reflected portion 152" of the projected non-visible image 152' is redirected to the camera 120 by a portion 111 of the optics 110, whereupon the camera 120 captures the portion 152''' of the projected portion 152" of the projected non-visible image 152'. Accordingly, the method 200 includes redirecting at least a portion of the received visible and non-visible image to a camera (act 205), and capturing the received visible and non-visible image (act 206). In some embodiments, the same camera 120 captures both the projected visible image 151' and the reflected non-visible image 152', though separate cameras 120 might capture each image instead.

A depth sensing module 130 detects depth information associated with surfaces within the field of projection 140 by using the captured image information regarding the portion 151''' of the reflected portion 151" of the projected visible image 151' and regarding the portion 152''' of the reflected portion 152" of the projected non-visible images 152'. Accordingly, the method 200 includes deriving depth information regarding one or more objects within the field of projection 140 of the visible image 151 using the captured portion 152''' of the reflected portion 152" of the non-visible image 152 (act 207).

Figure 3:
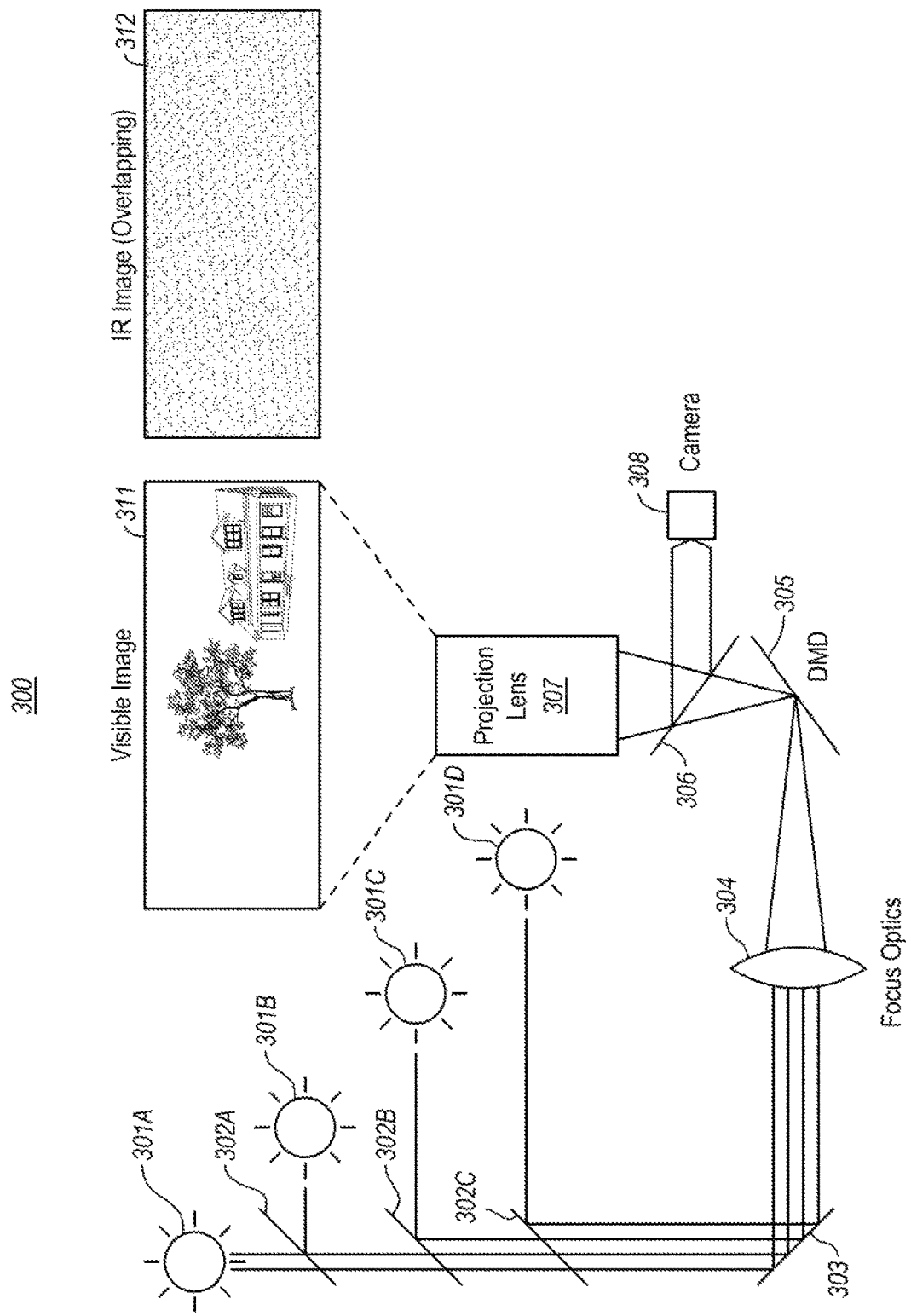
FIG. 3 illustrates a more detailed abstract diagram of a projection system, and represents an example of the projection system of FIG. 1.

FIG. 3 illustrates a more detailed abstract diagram of a projection system 300, and represents an example of the projection system 100 of FIG. 1. Here, a blue LED 301A emits through three one way mirrors 302A, 302B and 302C to generate a blue optical signal associated with a pixel of a visible image. Furthermore, a green LED 301B reflects off of one way mirror 302A to be collimated with the blue optical signal and also pass through the one way mirrors 302B and 302C to generate a green optical signal associated with the pixel of the visible image. Also, a red LED 301C emits light that reflects off of one way mirror 302B to be collimated with the blue and green signals and that also passes through the one way mirror 302C to generate a red optical signal associated with the pixel. The blue, green, and red optical signals are each reflected off of mirror 303, focused using focus optics 304, redirected with the Digital Micromirror Device (DMD) 305, passes through one way mirror 306, and is projected by the projection lens 307 as a pixel of the visible image 311.

In addition, an infra-red LED 301D for that pixel emits infra-red light, which reflects off of mirror 302C to be collimated with the visible optical signals for that pixel. The infra-red light likewise reflects off of mirror 303, is focused using focus optics 304, redirected with the Digital Micromirror Device (DMD) 305, passes through one way mirror 306, and is projected by the projection lens 307 as a pixel of the non-visible image 312. In one embodiment, this pixel of non-visible image 312 is overlaid on the same pixel of the visible image 311.

A portion of the visible image 311 and the non-visible image 312 are reflected back through the projection lens 307, and a portion of the reflected images are then redirected with the one way mirror 306 towards the camera 308.

The projection system and the camera 308 thus both use the same optics, and thus the assembly may be made quite small. In fact, the projection system 100 might be incorporated within a single computing system that may itself be quite small, such as a laptop, a smartphone, or an accessory to a laptop or smartphone.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

Figure 4:
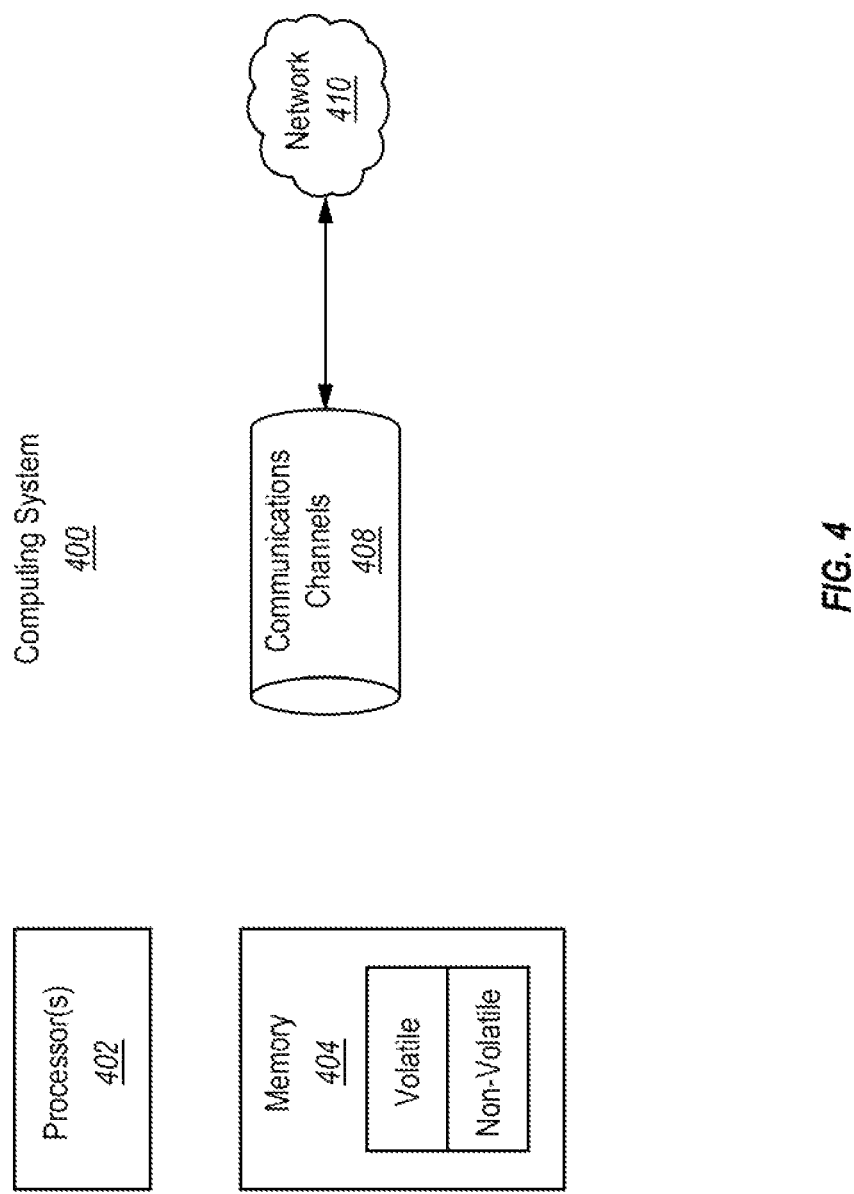
FIG. 4 abstractly illustrates a computing system that may be used to implement aspects described herein when using software.

As illustrated in FIG. 4, a computing system 400 includes at least one processing unit 402 and computer-readable media 404. The computer-readable media 404 may conceptually be thought of as including physical system memory, which may be volatile, non-volatile, or some combination of the two. The computer-readable media 404 also conceptually includes non-volatile mass storage. If the computing system 400 is distributed, the processing, memory and/or storage capability may be distributed as well.

As used herein, the term "executable module" or "executable component" can refer to software objects, routines, or methods that may be executed on the computing system. The different components, modules, engines, and services described herein may be implemented as objects or processes that execute on the computing system (e.g., as separate threads). Such executable modules may be managed code in the case of being executed in a managed environment in which type safety is enforced, and in which processes are allocated their own distinct memory objects. Such executable modules may also be unmanaged code in the case of executable modules being authored in native code such as C or C++.

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the computer-readable media 404 of the computing system 400. Computing system 400 may also contain communication channels 408 that allow the computing system 400 to communicate with other processors over, for example, network 410.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other tangible storage medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface controller (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

As an example, the depth processing module 130 may be created and/or operated by the computing system 400 in response to the computing system 400 accessing a computer program product having one or more computer-readable media 404 having thereon computer-executable instructions that are structured such that, when executed by one or more processors of the computing system 400, the computing system 400 creates and/or operates the depth processing module 130.

The depth processing module 130 might allow the computing system 400 to infer information regarding the surface on which the projection system projects in the absence of objects placed within the field of project, while likewise detecting objects and characteristics of objects placed within the field of projection. Thus, the depth information might affect state of the computing system 400 thereby affecting the visible image. In one embodiment, the non-visible image is a pattern that is perhaps repeated (although it may be a non-repeating pattern also) and that allows for depth information to be derived based on reflections of that pattern. Also, the depth information may be obtained by a non-visible image via phase-based or other time of flight methods, or any other method for determining depth information from non-visible images.

Physical embodiments of the projection system 100 will now be described, although the diversity within these two physical embodiments should convey that the projection system described herein really have no limit on the actual physical implementation.

First Physical Embodiment

Figure 5:
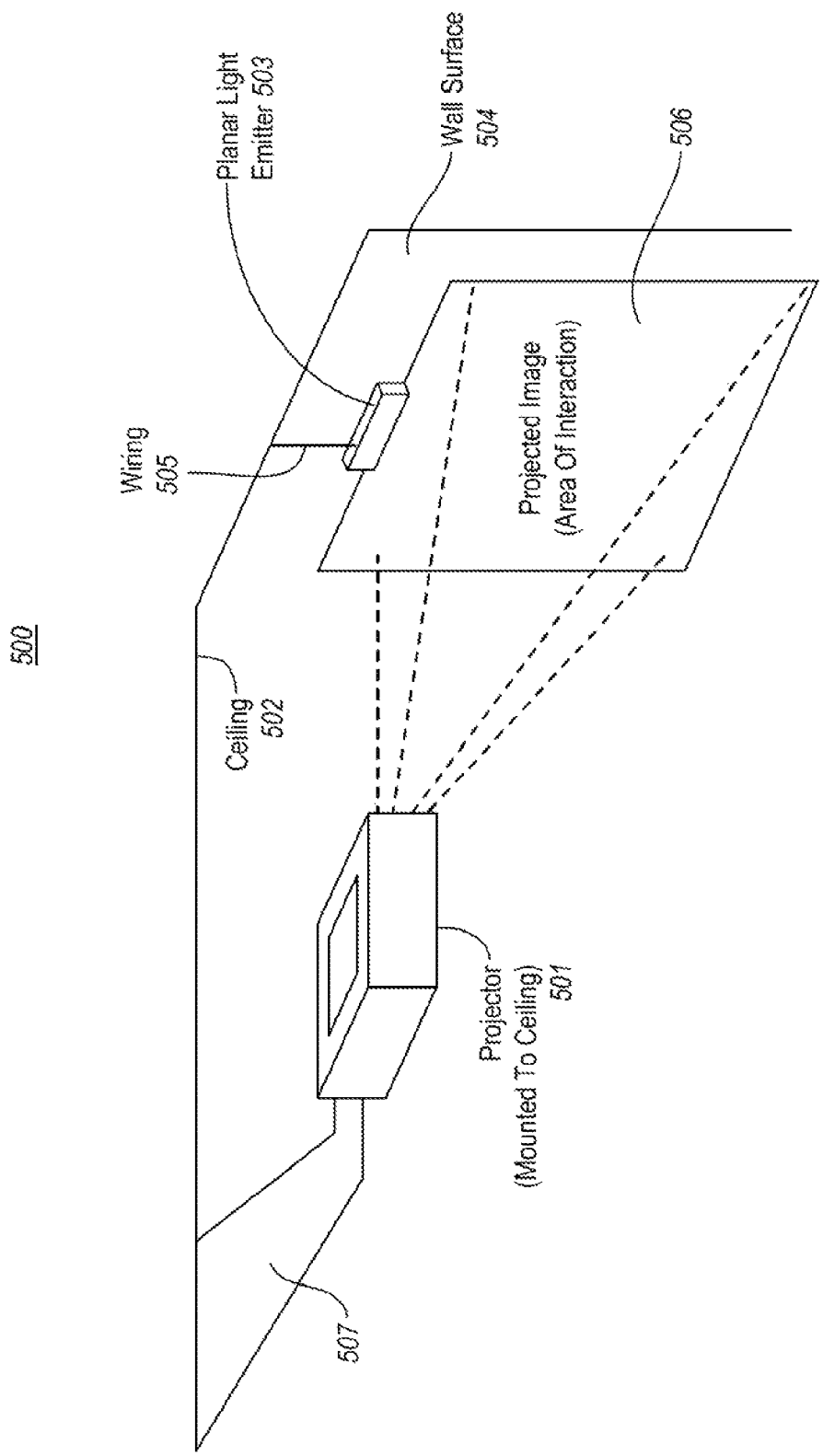
FIG. 5 illustrates a first physical embodiment in which the projection system is a projector mounted to a ceiling.

FIG. 5 illustrates a first physical embodiment 500 in which the projection system 100 is a projector 501 mounted to a ceiling 502 using mechanical mounts 507. Here, the projector 501 projects an image 506 onto a vertical wall surface 504. A planar light emitter 503 emits co-planar infra-red light planes, and based on reflections, provides capture depth information to the projector 501 (which depth information may supplement depth information captured within the projector 501 via its own optics). For instance, the planar light emitter 503 send electrical signals over wiring 505, although wireless embodiments are also possible.

Second Physical Embodiment

Figure 6A:
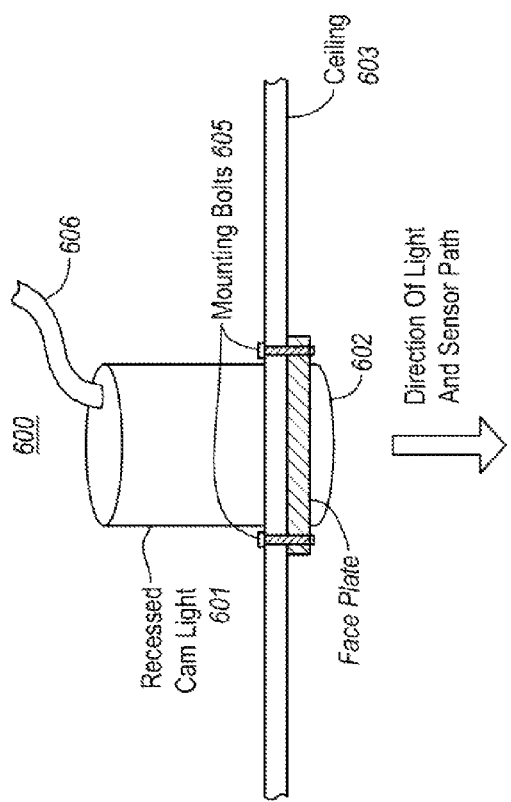
FIG. 6A illustrates a side view of a second physical embodiment in which the projection system is incorporated into a cam light system.
Figure 6B:
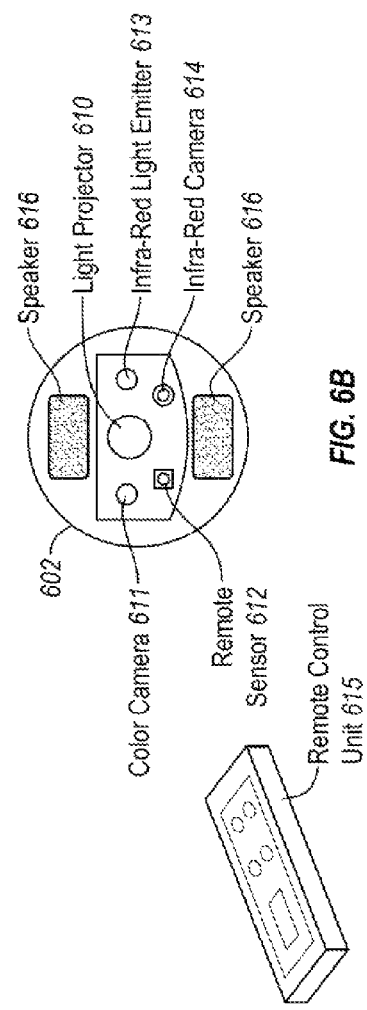
FIG. 6B illustrates a bottom view of the cam light system of FIG. 6A.

FIGS. 6A and 6B illustrates a second physical embodiment in which the projection system is incorporated into a cam light, or can light, and, thus, is referred to as a "cam light system 600." FIG. 6A illustrates a side view of the cam light system 600. The cam light system 600 includes the cam light 601 in which the projection system 100 is housed. The cam light 601 includes an exposed portion 602 that faces downward into the interior of the room whilst the remainder is generally hidden from view above the ceiling 603. A mounting plate 604 and mounting bolts 605 assist in mounting the cam light 601 within the ceiling 603. A power source 606 supplies power to the cam light 601.

FIG. 6B illustrates a bottom view, looking up, of the exposed portion 602 of the cam light 601. A visible light projector 610 emits light downward onto a horizontal surface below the cam light system 600 (such as a table or countertop). When not projecting images, the visible light projector 610 may simply emit visible light to irradiate that portion of the room, and function as a regular cam light. However, the remote controller 615 may be used to communicate to the remote sensor 612, when the visible light projector 610 is to take on its image projection role. When projecting images, the color camera 611 captures visible images reflected from field of projection. Optionally, an infrared light emitter 613 emits non-visible light so that the infrared camera 614 may capture reflections of that non-visible light to thereby extract depth information and thus user interaction within the field of projection. However, using the projection system 100 of FIG. 1, the infrared image may instead or addition be projected from the visible light projector 610. Speakers 616 emit sound associated with the projected visible image. Accordingly, users can quickly transition from sitting at the dinner table having a well-illuminated dinner, to a fun family game activity, without moving to a different location.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scopes.

What is claimed is:

1. A projector, comprising:
a plurality of projecting units, each projecting unit of the plurality of projecting units capable of projecting a pixel of a visible image and comprising a plurality of light-emitting elements capable of emitting light in the visible spectrum, each projecting unit of a collection of the plurality of projecting units further including at least one non-visible light-emitting element capable of emitting light outside of the visible spectrum, such that the collection of projecting units further emits a non-visible image outside of the visible spectrum, the non-visible image comprising a pattern superimposed with the visible image;
optics positioned to project the visible image emitted by the plurality of projecting units to a location, and also to project the non-visible image emitted by the collection of projecting units to the location, the optics including a portion that directs at least a portion of a reflected version of the non-visible image towards a camera;
the camera capable of capturing a reflected portion of the non-visible image, including a portion of the pattern reflected by a moving object over the visible image, the camera also capable of generating image signals corresponding to the portion of the pattern reflected by the moving object; and
a depth sensing module capable of receiving the image signals from the camera and of deriving depth information about a distance of the moving object from the location based on the image signals to enable a determination of how the moving object interacts with the visible image.

2. The projector in accordance with claim 1, wherein each projecting unit of the plurality of projecting units includes a red light-emitting element, a green light-emitting element, and a blue light-emitting element.

3. The projector in accordance with claim 1, wherein each projecting unit of the collection of projecting units includes an infra-red light emitting element.

4. The projector in accordance with claim 1, wherein each projecting unit of the plurality of projecting units and each projecting unit of the collection of projecting units includes a plurality of light-emitting diodes.

5. The projector in accordance with claim 1, wherein the collection of projecting units includes all of the plurality of projecting units.

6. The projector in accordance with claim 1, wherein at least some of the collection of projecting units each include a plurality of emitting elements that are capable of emitting light outside of the visible spectrum.

7. The projector in accordance with claim 1, further comprising mechanical attachments for attaching the projector to or within a ceiling.

8. The projector in accordance with claim 1, further comprising mechanical attachments for attaching the projector into a can light receptacle.

9. A computing system comprising:
   a projector that includes:
      a plurality of projecting units, each projecting unit of the plurality of projecting units capable of projecting a pixel of a visible image and comprising a plurality of light-emitting elements capable of emitting light in the visible spectrum, each projecting unit of a collection of the plurality of projecting units further including at least one non-visible light-emitting element capable of emitting light outside of the visible spectrum, such that the collection of projecting units further emits a non-visible image outside of the visible spectrum, the non-visible image comprising a pattern superimposed with the visible image; and
      optics positioned to project the visible image emitted by the plurality of projecting units to a location, and also to project the non-visible image emitted by the collection of projecting units to the location, the optics including a portion that directs at least a portion of a reflected version of the non-visible image towards a camera;
   the camera capable of capturing a reflected portion of the non-visible image, including a portion of the pattern reflected by a moving object over the visible image; and
   a depth sensing module capable of receiving image signals from the camera and of deriving depth information about a distance of the moving object from the location based on image signals corresponding to the portion of the pattern reflected by the moving object to enable a determination of how the moving object interacts with the visible image.

10. The computing system in accordance with claim 9, further comprising:
    one or more processors; and
    one or more computer-readable media that comprise computer-executable instructions that, when executed by the one or more processors, cause the computing system to create the depth sensing module.

11. The computing system in accordance with claim 9, further comprising:
    one or more processors; and
    one or more computer-readable media that comprise computer-executable instructions that, when executed by the one or more processors, cause the computing system to operate the depth sensing module.

12. A method for projecting an image comprising:
    emitting a portion of a visible image from each of a plurality of projecting units, each of the plurality of projecting units comprising a plurality of light-emitting elements capable of emitting light in the visible spectrum;
    emitting a portion of a non-visible image from each of at least some of the plurality of projecting units, each of the plurality projecting units that emits a portion of the non-visible image comprising at least one emitting element capable of emitting light in the non-visible spectrum;
    projecting the visible image and the non-visible image through optics to a desired location for the visible image, the non-visible image comprising a pattern;
    receiving a reflected portion of the pattern with the optics and directing at least some of the reflected portion of the pattern to a camera, the reflected portion of the pattern comprising a portion of the pattern reflected by one or more objects moving over the visible image;
    capturing at least a portion of the reflected portion of the pattern with the camera; and
    deriving depth information regarding a distance of the one or more objects over the visible image within a field of projection of the visible image from the desired location for the visible image based on the reflected portion of the pattern to enable a determination of how the one or more objects interact with the visible image as the one or more objects move over the visible image.

* * * * *